(12) United States Patent  (10) Patent No.: US 8,274,237 B2
Nagase et al.  (45) Date of Patent: Sep. 25, 2012

(54) LED DRIVER CIRCUIT WITH OVER-CURRENT PROTECTION DURING A SHORT CIRCUIT CONDITION

(75) Inventors: Haruo Nagase, Nara (JP); Takashi Kambara, Osaka (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 12/624,981

(22) Filed: Nov. 24, 2009

(65) Prior Publication Data

US 2010/0156324 A1  Jun. 24, 2010

(30) Foreign Application Priority Data

Nov. 25, 2008  (JP) ................................. 2008-300167

(51) Int. Cl.
*H05B 41/16* (2006.01)
(52) U.S. Cl. ..... 315/247; 315/291; 315/224; 315/185 S; 315/312
(58) Field of Classification Search .................. 315/247, 315/224, 225, 185 S, 274–279, 291, 307–326
See application file for complete search history.

(56) References Cited

U.S. PATENT DOCUMENTS

2008/0018261 A1 * 1/2008 Kastner .......................... 315/192

FOREIGN PATENT DOCUMENTS

JP  20070118847  5/2007

* cited by examiner

*Primary Examiner* — Tuyet Thi Vo
(74) *Attorney, Agent, or Firm* — Waddey & Patterson, P.C.; Mark J. Patterson

(57) ABSTRACT

An LED driver circuit is provided for protecting one (or more) LEDs connected in series from over-current damages which may result from a short circuit condition. The driver circuit includes a current control circuit for receiving an input signal from a power source and providing a current output for powering the LED. A voltage sensor detects a voltage across the LED. An LED current restriction circuit such as a switching element restricts a current flow into the LED. A short circuit response circuit controls the LED current restriction circuit dependent on a comparison between the voltage detected by the voltage sensor and a predetermined threshold value. When the detected voltage is less than or equal to the threshold value, the response circuit determines a short circuit, and a signal is sent to the current restriction circuit to restrict current flow into the one or more LEDs.

16 Claims, 11 Drawing Sheets

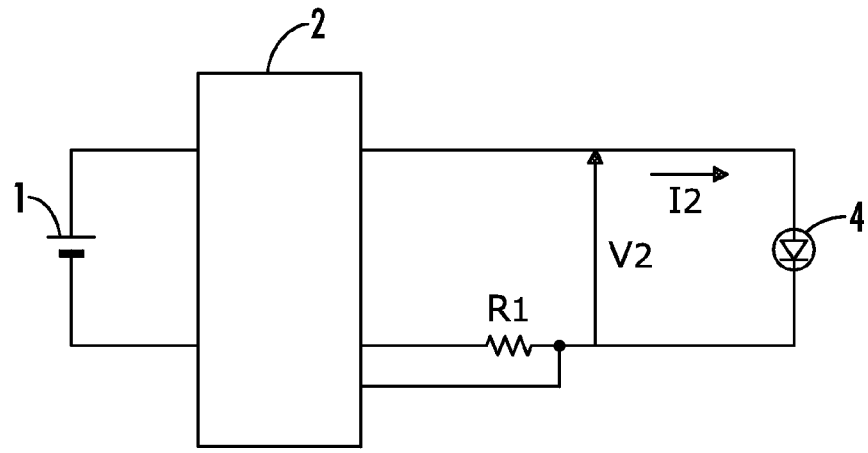
FIG. 18
*(PRIOR ART)*
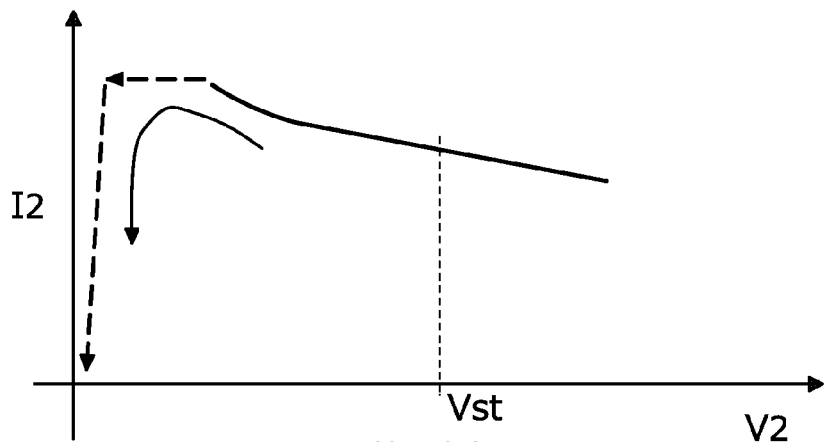
FIG. 19
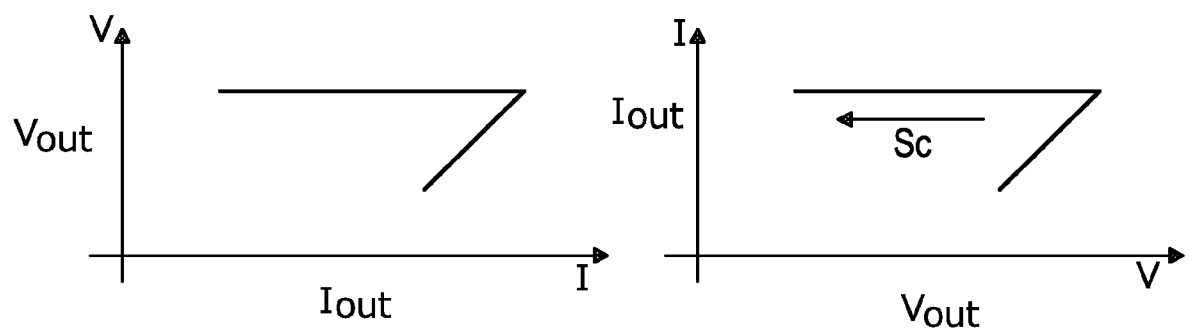
FIG. 20  FIG. 21

LED DRIVER CIRCUIT WITH OVER-CURRENT PROTECTION DURING A SHORT CIRCUIT CONDITION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2008-300167, filed Nov. 25, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to driver circuits for light emitting diodes (referred to as LED hereinafter). More particularly, the present invention relates to LED driver circuits having control circuitry for protecting an LED from over-current damage resulting from a short circuit fault.

LEDs have in recent years become extensively developed and mass produced in accordance with advances in higher luminance. Typically, an LED is provided with an LED chip which emits blue light, a color conversion module including translucent sealing materials (e.g. such as epoxy resin and silicone resin), and a phosphor layer by which the LED chip is covered and light serving as a complementary color is emitted through absorption of light emitted from the LED chip.

LEDs can serve even more diversified purposes with the emergence of LEDs which are capable of emitting white light (i.e. so-called white LEDs). LEDs have advantages such as longer life, excellent responsiveness, and a compact configuration in comparison with incandescent lamps. Because LEDs can themselves be provided in a small and light-weight configuration, this enables the formation of a thin and three-dimensional lighting fixture as a whole, so there are further advantages realized such as enhancing a degree of freedom in the design of lighting fixtures. Furthermore, light with a desired color can be easily obtained without using color filters.

With the development of LEDs which are capable of replacing incandescent lamps and fluorescent lamps and realize light emission with high luminance in a high output, there have been further developments in the field of vehicle lighting by including not only interior lamps and daytime running lamps for vehicle visibility improvement in daytime, but also in headlights.

LED luminance is generally decreased by a temperature rise resulting from self-heating by lighting. Therefore, LED driver circuits have been proposed which maintain constant luminance by controlling a current flowing into the LED in accordance with a lighting time of the LED.

Such a driver circuit to light the LED is, for example, shown in FIG. 18. A DC/DC converter 2 is adapted to control a current supplied from a DC power source 1 to an LED 4. An output from the DC/DC converter 2 is subjected to a feedback control so that a current I2 detected by a resistor R1, which is connected in series with the LED 4 and provided for current detection, is brought into a substantially constant state.

However, the feedback control of this configuration is performed for any output from the DC/DC converter 2, so as to increase the amount of a current flowing into the LED 4 not only in the case of compensation for a voltage decrease resulting from self-heating of the LED 4, but also in the case of dealing with a decrease of a forward direction voltage Vf of the LED 4 due to a short circuit of the LED 4 or other such reasons. Therefore, if the LED 4 fails and short-circuited for whatever reason, a larger amount of a current will continuously flow into the LED 4.

The LED 4 is typically provided with an LED chip using compound semiconductor materials (e.g. InGaN-based and AlInGaP-based materials) fixed on a substrate by adhesives such as solder and resin. Electrical connection between the LED chip and a circuit pattern of an external substrate circuit is established where a conductor pattern arranged on the substrate and an electrode of the LED chip are electrically connected to each other by an electrical connection member such as for example solder and/or a metal wire. Furthermore, the LED chip, the electrical connection member, the substrate, or other components are electrically and mechanically protected by covering them with a cover made of, for example, resin or glass directly or with air or the like interposed there-between. A illumination device having such an LED 4 as a light source is configured so that the LED 4 is arranged and fixed inside a lamp and fixture chassis covered with translucent glass, plastic, and the like in the front.

The high output LED 4 uses a plurality of LED chips each having a chip size of several hundreds μm square (e.g. 300 μm square) in serial connection or uses an LED chip with a large area equal to or more than 1 mm square, wherein higher output is achieved with a current ranging from several hundreds of mA to several amps flowing therein.

Therefore, a short circuit occurring in the high output LED 4 will result in a large heating value with a corresponding sharp temperature rise, followed by not only extinguishing of the LED 4 but other problems. A short circuit of the LED chip causes local overheating due to current concentration or other reasons, and the heat causes thermal expansion of air included in the LED 4 and/or sharp thermal expansion by evaporation of water included in a resin which may be used for an adhesive, cover or like purposes, whereby the LED 4 may be possibly damaged. In such cases, a short circuit of the LED 4 is accompanied by the failing of one or more components which constitute the LED 4 (such as an LED chip, adhesive, a substrate and a cover) on a lamp and fixture of a illumination device, internally contaminating and/or damaging the lamp and fixture, and possibly hindering the reuse of the illumination device.

Particularly because the high output LED 4 often uses solder in place of a metal wire as an electrical connection material, the LED 4 tends to be damaged by a short circuit rather than an open circuit resulting from disconnection of a metal wire. Moreover, a short circuit of the LED 4 not only causes a complete short circuit but also complicates a magnitude of a decrease of the forward direction voltage Vf.

FIG. 19 shows the current I2 which flows into the LED 4 when the DC/DC converter 2 is subjected to the feedback control so as to realize constant luminance of the LED 4, in relation to the voltage V2 across the LED 4 (i.e. current/voltage characteristics of the LED 4) in the driver circuit of FIG. 18, exemplifying a current/voltage locus observed when the LED 4 is short-circuited. Note that FIG. 19 shows a normal lighting state of the LED 4 when the voltage V2 across the LED 4 is higher than a voltage Vst.

Usually, lighting of the LED 4 is followed by a gradual decrease of the forward direction voltage Vf associated with a temperature rise resulting from self heating of the LED 4, and luminance of the LED 4 is accordingly decreased. In compensation for the luminance decrease of the LED 4, a feedback control is performed to increase the current I2 supplied to the LED 4 and to further increase the luminance of the LED 4, wherein current/voltage characteristics are observed as shown by a solid line in FIG. 19. When the LED 4 is short-circuited, the current I2 which continuously flows along with a decrease of the forward direction voltage Vf of the LED 4 finally reaches zero as shown by a broken line in FIG. 19. As a result, a short circuit of the LED 4 is accompanied by a longer period of time for an over-current to flow into the LED 4 with an increased heating value of the LED 4, whereby damage to the LED 4 may result and possibly cause a large scale contamination, impairment, or other such problems in a lighting fixture.

It is also possible to consider disabling the above driver circuit by using a fuse or other means. However, this is based on the assumption that current is stopped after the LED 4 is short-circuited with a temperature rise in an LED chip or other components, which means protection of the driver circuit can be achieved without sufficiently preventing contamination and impairment in the lamp and fixture or other components due to the LED 4 being damaged.

There has been proposed a power conversion device capable of obtaining desired output power from an input power, wherein a switching power source using a switching element for power conversion and a constant voltage control adjustment is employed to protect the switching power source from an over-current and overpower condition. An output characteristic of such a power conversion device shows a chevron-shaped characteristic as shown in FIG. 20, wherein an output voltage Vout is usually constant and a current is decreased when an output current Iout exceeds a predetermined value (i.e. over-current).

With an object of preventing the LED 4 from being damaged by applying such a switching power source to an LED driver circuit, it has further been proposed to use a current control circuit for a constant current driving control because the LED 4 does not usually require a high voltage, and luminance control by a current is easier to carry out. Therefore, an output characteristic of the current control circuit using a constant current driving control is exemplified as shown in FIG. 21, wherein an output current Iout is usually constant and is decreased when an output voltage Vout reaches or exceeds a predetermined value. However, if the LED 4 has a short circuit failure (graphically labeled as SC), the constant current control causes a voltage decrease, leaving a problem that a current flowing into the LED 4 cannot be reduced even if the voltage V2 across the LED 4 is decreased due to a short circuit of the LED 4.

BRIEF SUMMARY OF THE INVENTION

The present invention was achieved by taking the above problems into consideration, having an object to provide a driver circuit capable of preventing an LED from being damaged by a short circuit failure of the LED.

According to a first aspect of the present invention, an LED driver circuit includes a current control circuit adapted to control a current supplied from a power source to an LED. The driver circuit includes a voltage sensor capable of detecting a voltage across the LED, an LED current restriction circuit capable of restricting a current flowing into the LED, and a short circuit response circuit for controlling the current restriction circuit to restrict a current flowing into the LED when a voltage detected by the voltage sensor is equal to or less than a predetermined value defined for short circuit determination for the LED.

According to this aspect, if a voltage detected by the voltage sensor is equal to or less than a predetermined value defined for short circuit determination for the LED, the short circuit response circuit determines that the LED is short-circuited and acts to restrict a current supplied to the LED, whereby an over-current is not continuously provided into the LED. The driver circuit is therefore capable of preventing further damage to the LED associated with a temperature rise occurring when the LED has a short circuit failure.

In a second aspect of the present invention, based on the first aspect, the current control circuit is a converter which controls a current supplied to the LED by using a switching element, and the LED current restriction circuit uses the switching element to restrict a current flowing into the LED.

According to this aspect, a simplified configuration can be achieved because the switching element in the converter for use in lighting the LED can further be used to perform the functions of the above LED current restriction circuit. The LED current restriction circuit can further be incorporated in the current control circuit, allowing miniaturization of the LED driver circuit.

In a third aspect of the present invention, also based on the first aspect, the LED current restriction circuit is a switching element connected in series between the power source and the LED.

According to this aspect, a current flowing into the LED is restricted by the switching element connected in series with the LED, so that a period of time for an over-current to flow into the LED in a short circuit state thereof can be minimized by a relatively simple configuration.

A fourth aspect of the present invention is based on any one of the first to third aspects of the present invention, wherein the predetermined value corresponds to a value in a range from 1/3 times to 5/9 times a normal voltage across the LED.

According to this aspect, if a voltage is equal to or less than the predetermined value in this specific range, the short circuit response circuit spuriously determines the LED is short-circuited. It should be noted in particular that a voltage lower than 1/3 times a normal voltage across the LED will result in a longer period of time for an over-current to flow into the short-circuited LED, whereas a voltage higher than 5/9 times a normal voltage will result in larger variations of a voltage across of the LED due to deterioration of the LED with the elapse of time and manufacturing variations among LEDs, wherein malfunction of the short circuit response circuit may be possibly observed. However, these problems can be effectively prevented.

A fifth aspect of the present invention is based on any one of the first to fourth aspects of the present invention, wherein the short circuit response circuit controls the LED current restriction circuit so as to restrict a current flowing into the LED upon determining a short circuit of the LED exists, if a voltage detected by the voltage sensor is equal to or less than the predetermined value and the voltage is decreasing.

According to this aspect, a current flowing into the LED can be restricted even if a current is made to flow again from the power source to the LED after observing a short circuit of the LED.

A sixth aspect of the present invention is based on the first aspect of the present invention, wherein the current control circuit is a converter to control a current supplied to the LED by a first switching element, and the LED current restriction circuit restricts a current flowing into the LED by using both the first switching element in the current control circuit and a second switching element connected in series between the power source and the LED.

According to this aspect, a current supplied to the LED can be restricted by using both the switching element connected in series with the LED and the switching element arranged in the current control circuit, thereby making it possible to prevent the LED from being damaged while protecting the driver circuit when the LED is short-circuited.

A seventh aspect of the present invention is based on the third aspect of the present invention, wherein the LED current restriction circuit has a current limiting resistor connected in parallel with the switching element.

According to this aspect, even if the LED is short-circuited, a restricted current can be continuously made to flow while preventing the LED from being damaged. Particularly when an array of LEDs are connected in series, proper lighting of LEDs which are not short-circuited can be maintained while simultaneously preventing short-circuited LEDs from being damaged. Therefore, extinguishing the entire LED array can be avoided even where the LED array is partially short-circuited.

An eighth aspect of the present invention is based on any one of the first to seventh aspects of the present invention, wherein the power source is a DC power source, and the current control circuit is a DC/DC converter using a step-up circuit.

According to this aspect, even if the DC power source serving as the power source has a low output, a higher voltage than that provided by the DC power source can be generated, whereby the driver circuit can be provided with sufficient power to allow serial connection of a larger number of LEDs.

A ninth aspect of the present invention is based on any one of the first to seventh aspects of the present invention, wherein the power source is a DC power source and the current control circuit is a DC/DC converter using a flyback transformer.

According to this aspect, even if the DC power source has a low output, a higher voltage than that provided by the DC power source can be generated, whereby the driver circuit can be provided with sufficient power to allow serial connection of a larger number of LEDs.

BRIEF DESCRIPTION OF THE SEVERAL VIEWS OF THE DRAWINGS

FIG. 1b is a schematic showing a short circuit response circuit of the LED driver circuit of the embodiment of FIG. 1a.

FIG. 2 is a graphical diagram showing operational characteristics according to the embodiment of FIG. 1a.

FIG. 3 is a graphical diagram showing operational characteristics according to the embodiment of FIG. 1a.

FIG. 18 is a circuit diagram showing an LED driver circuit of the prior art.

FIG. 19 is a graphical diagram showing operational characteristics according to an example from the prior art.

FIG. 20 is a graphical diagram showing operational characteristics of a power converter according to an example from the prior art.

FIG. 21 is a graphical diagram showing operational characteristics of a power converter according to an example from the prior art.

DETAILED DESCRIPTION OF THE INVENTION

Figure 1A:
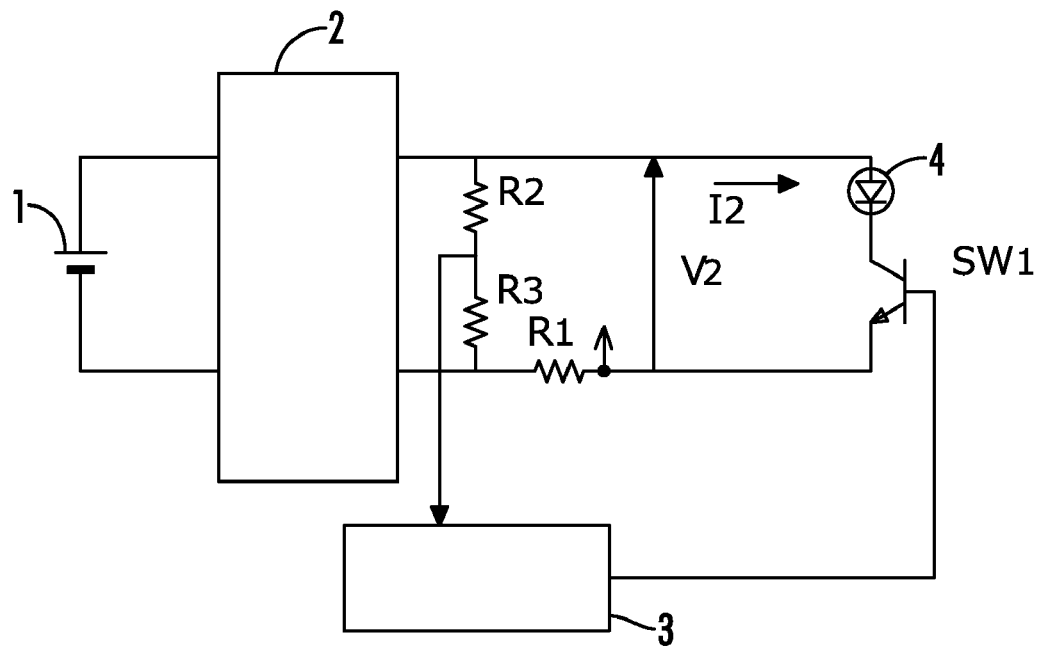
FIG. 1a is a schematic showing an LED driver circuit according to an embodiment of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

An LED driver circuit in accordance with the present invention may be described herein with reference to FIGS. 1-17. Where the various figures may describe embodiments sharing various common elements and features with other embodiments, similar elements and features are given the same reference numerals and redundant description thereof may be omitted below.

In various embodiments, the LED driver circuit is provided with a short circuit response circuit, an LED current restriction circuit, and a voltage sensor. The short circuit response circuit is for controlling the LED current restriction circuit so as to restrict a current flowing into the LED if a voltage detected by the voltage sensor, which is capable of detecting a voltage across the LED, is equal to or less than a predetermined value defined for short circuit determination for the LED. If a voltage detected by the voltage sensor is decreased to be lower than the predetermined value defined for short circuit determination, a short circuit of the LED is determined and the current flowing into the LED is restricted, so that an over-current is not continuously provided into the LED. The driver circuit is therefore capable of preventing the LED from being damaged by over-current when a short circuit fault occurs.

An embodiment of the driver circuit according to the present invention is as shown in FIG. 1a, including a DC/DC converter as a current control circuit 2 adapted to control a current supplied from a DC power source 1 serving as a power source to an LED 4. Connected between output terminals of the DC/DC converter 2 is a series circuit including the LED 4, a switching element SW1 for example, a transistor, and a resistor R1 preferably arranged for current detection. The switching element SW1 constitutes an LED current restriction circuit for restricting a current flowing into the LED 4.

Also connected between output terminals of the DC/DC converter 2 in the driver circuit according to the present embodiment is a voltage sensor which includes a series circuit including a voltage dividing resistor R2 and a voltage dividing resistor R3 and capable of detecting a voltage V2 across the LED 4. The driver circuit according to the present embodiment also has a short circuit response circuit 3 for controlling the switching element SW1 serving as the LED current restriction circuit so as to restrict a current flowing into the LED 4 by comparing a voltage detected by the voltage sensor to a predetermined value defined in advance for short circuit determination for the LED 4, and if the aforementioned detected value is equal to or less than the predetermined value. The LED 4 in this embodiment may be a high-output white LED, using GaN-based materials.

Figure 1B:
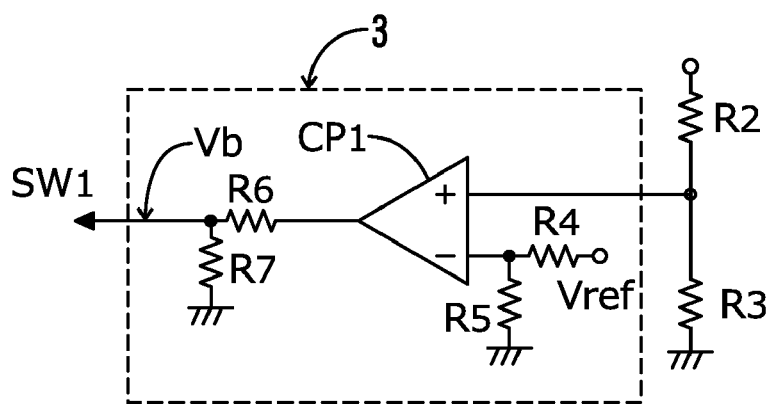

An example of the short circuit response circuit 3, as further shown in FIG. 1b, has a comparator CP1 with a non-inverting input terminal connected to a connection point of the voltage dividing resistors R2 and R3 in the aforementioned voltage sensor. Therefore, a voltage detected by the voltage sensor is input to the non-inverting input terminal of the comparator CP1. Also connected to an inverting input terminal of the comparator CP1 is a connection point of a voltage dividing resistor R4 for dividing a reference voltage Vref and a voltage dividing resistor R5. Therefore, a predetermined value defined for short circuit determination for the LED 4 is defined by the divided reference voltage and input to the inverting input terminal of the comparator CP1. An output from the comparator CP1 is divided by a voltage dividing resistor R6 and a voltage dividing resistor R7 and provided to the switching element SW1 as a control signal Vb.

Figure 2:
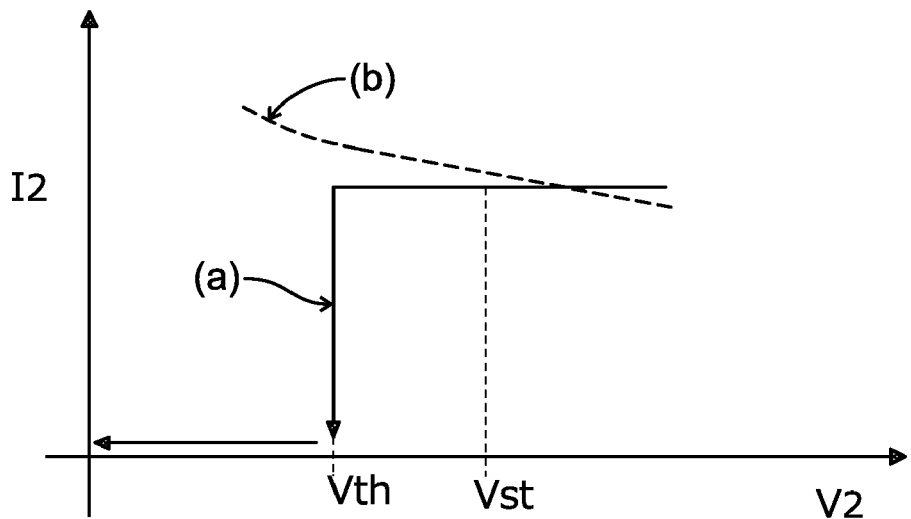

Explained next is an operation for determining a short circuit by the short circuit response circuit 3 in the driver circuit according to the present embodiment. FIG. 2 shows an example of current/voltage characteristics in the driver circuit using a solid line (a) where a voltage obtained in a normal lighting state of the LED 4 is equal to or more than Vst. V2 corresponds to a voltage across the LED 4, and I2 corresponds to a current flowing into the LED 4. FIG. 2 also shows, as a reference example shown by a broken line (b), a part of the current/voltage characteristics of the LED 4 observed in the configuration of the driver circuit shown in FIG. 19 for comparison.

In the present embodiment, the current I2 is constant if the LED 4 is subjected to a constant current driving control. However, once the LED 4 is short-circuited, the voltage V2 starts decreasing. When the voltage V2 becomes lower than the voltage Vst, which preferably allows lighting of the LED 4 as a normal state of the voltage V2, and reaches a threshold voltage Vth (corresponding to the predetermined value defined for short circuit determination for the LED 4) or less, the short circuit response circuit 3 determines that the LED 4 is short-circuited. The short circuit response circuit 3 follows up by controlling the switching element SW1 to cut off a current supplied to the LED 4, whereby the current I2 reaches zero at the threshold voltage Vth.

In further detail, the short circuit response circuit 3 uses the comparator CP1 to compare a voltage detected by the voltage sensor, which is capable of detecting the voltage V2 across the LED 4, to a threshold voltage Vth defined in a range lower than the voltage Vst corresponding to a normal lighting state of the LED 4. If a voltage detected by the voltage sensor is equal to or less than the threshold voltage Vth, the short circuit response circuit 3 determines that the LED 4 is short-circuited and the control signal Vb outputted from the comparator CP1 to the switching element SW1 exhibits an L level.

In accordance with the change of the control signal Vb, the switching element SW1 is turned off and prevented from being turned back on, so as to stop the current I2 flowing into the LED 4. Therefore, an over-current is not continuously provided into the LED 4 which is short-circuited, preventing the LED 4 from being damaged as a result of the short circuit of the LED 4.

Figure 3:
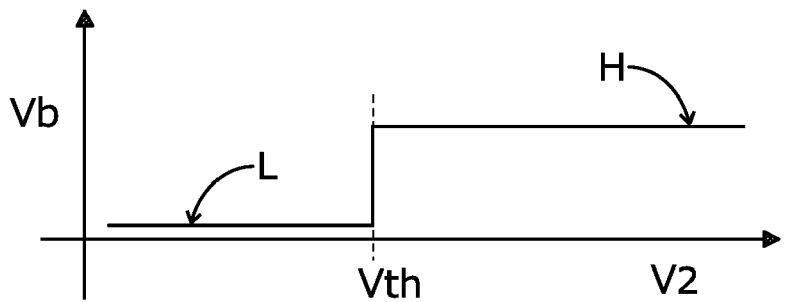

FIG. 3 demonstrates an operation of turning on/off the switching element SW1 with respect to the control signal Vb sent from the short circuit response circuit 3 and the voltage V2 across LED 4. Here, if the voltage V2 in a normal state is higher than the threshold voltage Vth of the LED 4, the control signal Vb provided from the short circuit response circuit 3 exhibits an H level to allow the switching element SW1 to be turned on.

In contrast, once the LED 4 is short-circuited due to some fault in the LED 4, and if the voltage V2 is decreased to reach or fall below the threshold voltage Vth of the LED 4, the short circuit response circuit 3 determines that the LED 4 has a short circuit fault, wherein the control signal Vb outputted from the short circuit response circuit 3 to the switching element SW1 exhibits an L level. Therefore, the switching element SW1 is turned off at the threshold voltage Vth or less.

Figure 4A:
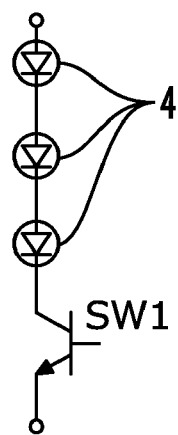
FIGS. 4a-4b are circuit diagrams showing alternative embodiments of the LED driver configuration shown in FIG. 1.

The present embodiment as described includes one LED 4 serving as a load, but a plurality of LEDs 4 may also be used in various arrays including serial connection, parallel connection or multiple connections in series and parallel. The threshold voltage Vth in this case varies depending on a characteristic of the LEDs 4, but can be defined based on a value of the forward direction voltage Vf of one of the LEDs 4. Connection between the LEDs 4 and the LED current restriction circuit may also be realized, for example, as shown in FIG. 4a wherein a plurality of the LEDs 4 are connected in series to the switching element SW1 serving as the LED current restriction circuit. Alternatively, the connection may be as shown in FIG. 4b wherein the LED current restriction circuit including the switching element SW1 and a current limiting resistor Rs connected in parallel with the switching element SW is provided to be connected with a plurality of the LEDs 4 in series.

Figure 4B:
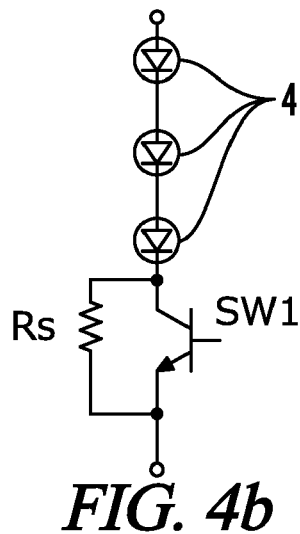

In the case of FIG. 4b, even if a portion of the plurality of LEDs 4 have a short circuit fault with the switching element SW1 turned off, a current flowing into the LED 4 is restricted by the current limiting resistor Rs and the remaining normal LEDs are continuously lit with a reduced current. It is therefore possible to avoid extinguishing the entire array of LEDs 4 while only a portion of the array of LEDs 4 is short-circuited. Various configurations for lighting the LEDs 4, methods for connecting the LEDs 4, and numbers of LEDs 4 in an array as stated above may be appropriately established as desired and are anticipated as being within the scope of the present embodiment of the invention.

A predetermined value defined for short circuit determination for the LED 4 preferably corresponds to a value in a range from 1/3 times to 5/6 times the voltage V2 across the LED 4 in a normal state, depending on the materials used for the LED chip. A voltage lower than 1/3 times the voltage V2 thereof in a normal state will result in a longer period of time for an over-current to flow into the LED 4 which is short circuited, whereas a voltage higher than 5/6 times the voltage V2 in a normal state will result in a larger variation of the voltage V2 across the LED 4 due to deterioration of the LED 4 with the elapse of time and manufacturing variations among the LEDs 4, leaving a possibility of causing the short circuit response circuit 3 to malfunction.

In the case of a high output LED chip using GaN-based materials in which a driving current is in a range from several hundreds of mA to several A, the forward direction voltage Vf of the LED 4 (i.e., the voltage V2) usually is in a range from 3.2V to 3.6V, so that the threshold voltage Vth of the LED 4 is preferably defined in a range from for example 1.0V to 2.0V.

Although the DC/DC converter 2 is used as the current control circuit in the present embodiment, various forms of current control circuitry may alternatively be selected depending on the specification of the power source and the LED 4 as long as the LED 4 can be operated by controlling a current supplied from a power source such as the DC power source 1 to the LED 4. The current control circuit may also be, for example, simply a current limiting resistor and/or various alternative types of converters including step-up, step-down and step-up/step-down converters.

In compensation for the aforementioned self-heating properties of the LED, the driver circuit in an embodiment may also include a feedback control preferably performed on an output from the DC/DC converter 2 so that the current I2 detected by the resistor R1 which is connected in series to the LED 4 and provided for current detection is brought into a substantially constant state.

A driver circuit according to an alternative embodiment is configured basically in the same manner as in that shown in FIG. 1a except for a different circuit configuration of the short circuit response circuit 3.

Figure 5:
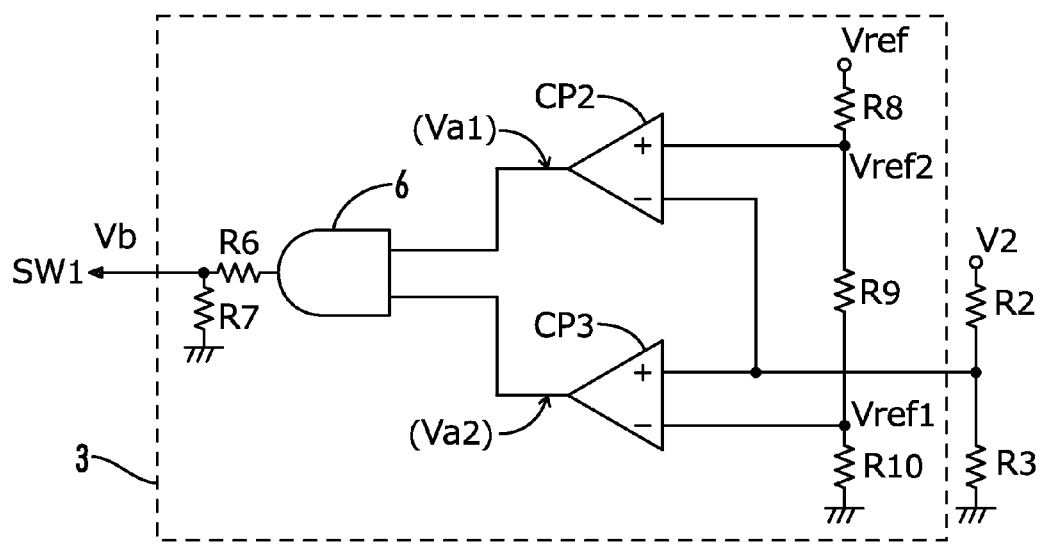
FIG. 5 is a circuit diagram of a short circuit response circuit for an LED driver circuit according to another embodiment of the present invention.
Figure 6:
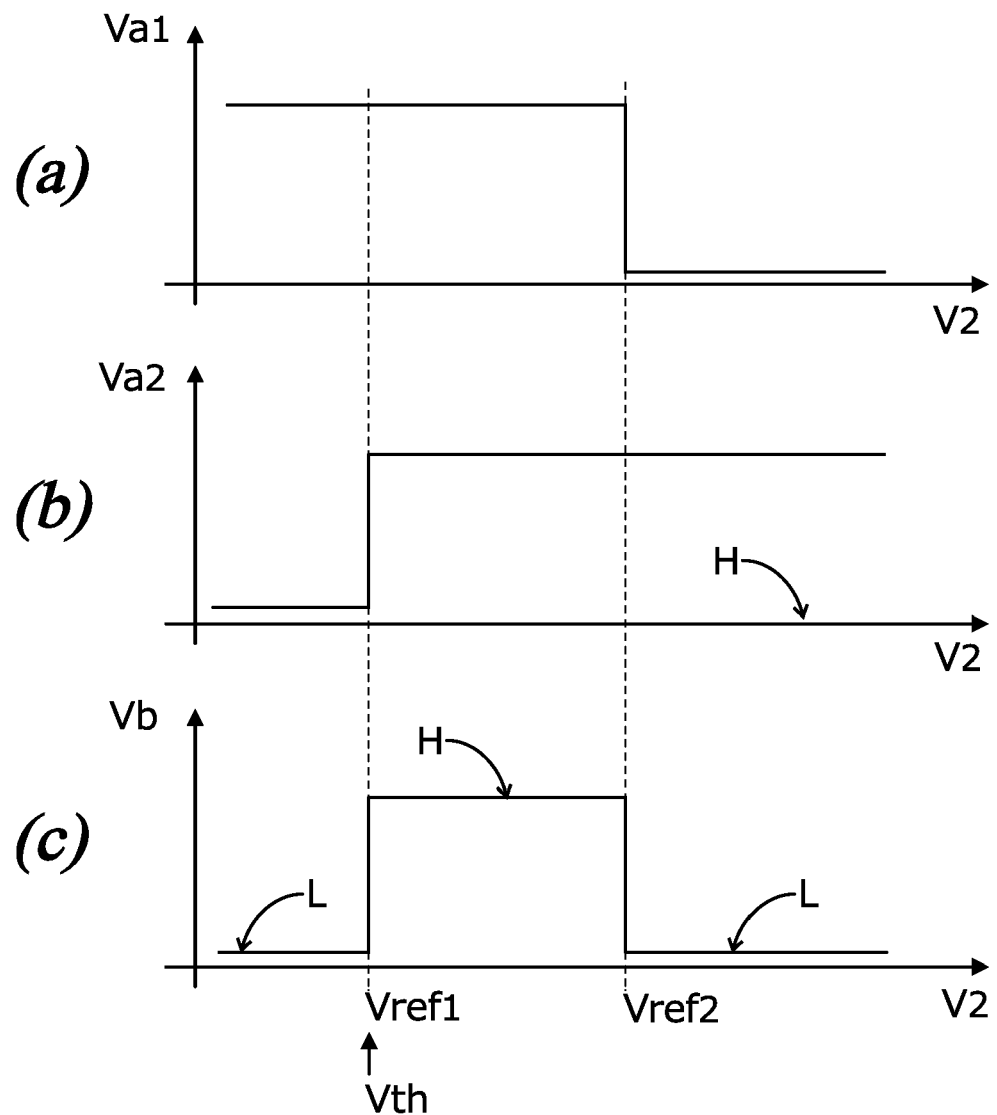
FIGS. 6a-6c are graphical diagrams showing operational characteristics according to the embodiment of FIG. 5.

The short circuit response circuit 3 in the embodiment as shown in FIG. 5 has two comparators CP2 and CP3 and an AND element 6, wherein the comparators CP2 and CP3 are connected such that a voltage detected by a voltage sensor including voltage dividing resistors R2 and R3 is input to an inverting input terminal of the comparator CP2 and a non-inverting input terminal of the other comparator CP3, respectively. A reference voltage Vref is divided by resistors R8, R9 and R10 with such connections that a divided voltage Vref1 is input to a non-inverting input terminal of the comparator CP2 and a divided voltage Vref1 is input to an inverting input terminal of the other comparator CP3. Connected to an input terminal of the AND element 6 are respective output terminals of the comparators CP2 and CP3. An output terminal of the AND element 6 is connected to a voltage dividing resistor R6 and a voltage dividing resistor R7, whereby a voltage divided in the AND element 6 is provided to the switching element SW1 as the control signal Vb.

Described next with reference to FIGS. 6a-6c is an operation of the short circuit response circuit 3 in the embodiment of FIG. 5. FIGS. 6a-6c show an output voltage V2 across the LED 4 along with output signals Va1 and Va2 obtained in the comparators CP2 and CP3, respectively, and a control signal Vb (referring to FIG. 5). FIG. 6a shows an output signal Va1 of the comparator CP2, FIG. 6b shows an output signal Va2 of the comparator CP3, and FIG. 6c shows a control signal Vb output via the AND element 6.

The voltage Vref1, serving as an upper limit value defined for a voltage applied to the LED 4, is input to the non-inverting input terminal of the comparator CP2. If a voltage which is detected by the voltage sensor and input to the inverting input terminal thereof is equal to or less than the voltage Vref1, the comparator CP2 provides the output signal Va1 in the H level. In contrast, the comparator CP2 provides the output signal Va1 in the L level if the voltage Vref1 serving as an upper limit value defined for a voltage applied to the LED 4 is larger than a voltage detected by the voltage sensor (referring to FIG. 6a).

Also, if a voltage which is detected by the voltage sensor and input to the non-inverting input terminal of the comparator CP3 is larger than the voltage Vref1 which is connected to the inverting input terminal thereof and serves as a predetermined value defined in advance for short circuit determination for the LED 4, the comparator CP3 provides the output signal Va2 in the H level. In contrast, the comparator CP3 provides the output signal Va2 in the L level if a voltage detected by the voltage sensor is equal to or less than the voltage Vref1 serving as a predetermined value defined in advance for short circuit determination for the LED 4 (referring to FIG. 6b).

Therefore, the voltage Vref1 serves as the threshold voltage Vth corresponding to the predetermined value defined for short circuit determination for the LED 4. If both of the output signals Va1 and Va2 provided from the comparators CP2 and CP3, respectively, are both in the H level, the control signal Vb output from the AND element 6 is brought into the H level, whereas if either one of the output signal Va1 from the comparator CP2 and the output signal Va2 from the comparator CP3 is in the L level, the output signal Vb from the AND element 6 is brought into the L level (referring to FIG. 6c).

The driver circuit according to the embodiment turns on the switching element SW1 only when the control signal Vb exhibits the H level, wherein a current flows into the LED 4. In contrast, when the control signal Vb is in the L level, the driver circuit will turn off the switching element SW1 so that no current flows into the LED 4.

Accordingly, the short circuit response circuit 3 in the present embodiment has more functions than detecting only a predetermined value defined for short circuit determination for the LED 4 in order for the switching element SW1 to restrict a current flowing into the LED 4. The driver circuit in the embodiment described uses the short circuit response circuit 3 which controls the switching element SW1 to restrict a current flowing into the LED 4 so that the LED 4 can be lit when the voltage V2 across the LED 4 is in a predetermined voltage range. Therefore, in the driver circuit according to the embodiment, the short circuit response circuit 3 determines the predetermined voltage range and controls the LED current restriction circuit so as to restrict a current flowing into the LED 4, whereby the driver circuit can be provided with higher reliability.

Figure 7:
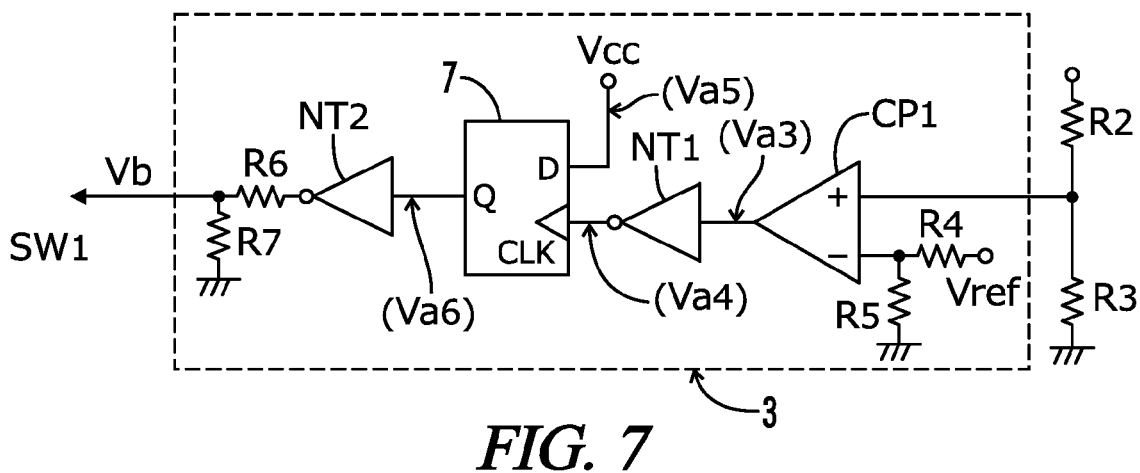
FIG. 7 is a circuit diagram showing a short circuit response circuit in a driver circuit according to another embodiment of the present invention.
Figure 8:
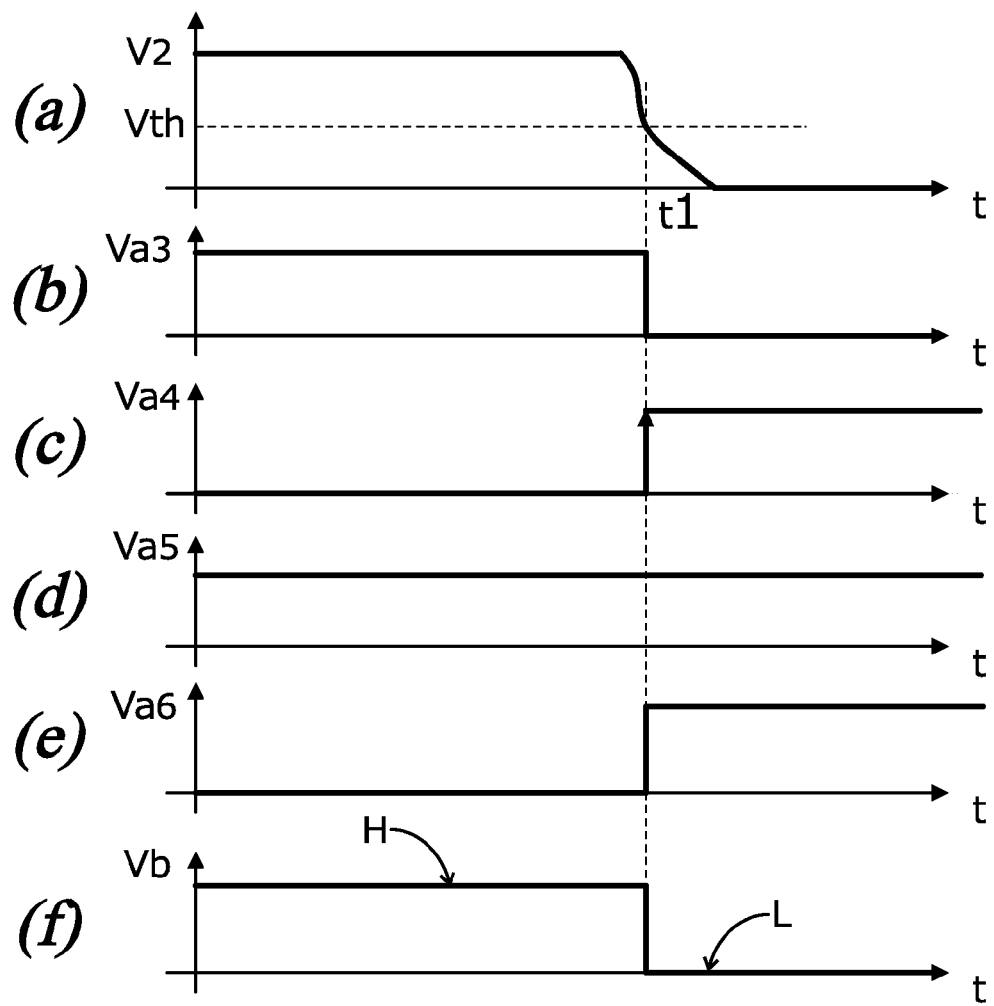
FIGS. 8a-8f are graphical diagrams showing operational characteristics according to the embodiment of FIG. 7.

Referring now to FIG. 7, in another embodiment the short circuit response circuit 3 may be provided with digital logic circuitry and connections. A value of a voltage divided by the voltage sensor including voltage dividing resistors R2 and R3 is input to a non-inverting input terminal of a comparator CP1. A voltage obtained by dividing a reference voltage Vref by voltage dividing resistors R4 and R5 is input to an inverting input terminal of the comparator CP1. The comparator CP1 has an output terminal connected to an input terminal of a first inverter element NT1 whose output terminal is connected to a clock terminal (referred to as a CLK terminal hereinafter) of a D-type flip-flop element 7. The D-type flip-flop element 7 also has a data input terminal (referred to as a D terminal hereinafter) which is connected to a positive power source Vcc. An output from an output terminal (referred to as a Q terminal hereinafter) of the D-type flip-flop element 7 is inverting via a second inverter element NT2, and a voltage divided by voltage dividing resistors R6 and R7 is input to the switching element SW1 as a control signal Vb. In various embodiments the first inverter element NT1 may also be preferably provided with a Schmitt circuit conducting a hysteresis operation for increased stabilization.

Described next with reference to FIGS. 8*a*-8*f* is an operation of the short circuit response circuit 3 in accordance with the embodiment of FIG. 7. FIGS. 8*a*-8*f* respectively show, with the elapse of time t, the voltage V2 across the LED 4, output signals Va3, Va4, Va5 and Va6 provided from the comparator CP1, the first inverter element NT1, the positive power source Vcc, and the D-type flip-flop element 7 respectively, and the control signal Vb (referring to FIG. 7).

The voltage V2 across the LED 4 starts decreasing from a normal lighting state of the LED 4 due to a short circuit fault or the equivalent, and decreases to the threshold voltage Vth of the LED 4 or less at time t1 and thereafter (refer to FIG. 8*a*).

The comparator CP1 compares a voltage detected by the voltage sensor to a predetermined value defined for short circuit determination for the LED 4. If the voltage is equal to or less than a predetermined value, the output signal Va3 thereof is brought into the L level from the H level (refer to FIG. 8*b*).

Next, at time t1 at which the output signal Va3 of the comparator CP1 is brought into the L level, the output signal Va4 from the first inverter element NT1 is brought into the H level (refer to FIG. 8*c*).

On the other hand, observed in the D terminal of the D-type flip-flop element 7 is the positive power source Vcc which is constant even if the voltage V2 across the LED 4 is decreased. Thus, the output signal Va5 remains in the H level (refer to FIG. 8*d*).

In this case, the D-type flip-flop element 7 has the D terminal to which the output signal Va5 in the H level is input from the positive power source Vcc, and the CLK terminal to which the output signal Va4 in the H level is input from the first inverter element TN1, whereby the Q terminal outputs the output signal Va6 in the H level (refer to FIG. 8*e*).

The output signal Va6 from the D-type flip-flop element 7 is inverting in the second inverter element NT2, and a voltage divided by the voltage dividing resistors R6 and R7 is output as the control signal Vb from the short circuit response circuit 3. Therefore, the switching element SW1 is adjusted from being turned on to being turned off at time t1 so as to cut off a current flowing into the LED 4 (refer to FIG. 8*O*.

Meanwhile, a voltage obtained between the output terminals of the current control circuit after turning off the switching element SW1 may vary depending on the type of the current control circuit. In various embodiments, when a current flowing into the LED 4 is cut off by turning off the switching element SW1 serving as the LED current restriction circuit, the short circuit response circuit 3 uses the voltage dividing resistors R2 and R3 to detect a voltage between the output terminals of the DC/DC converter 2 (refer to FIG. 1*a*). That is, after turning off of the switching element SW1 by the control signal Vb sent from the short circuit response circuit 3, the voltage sensor still detects a voltage between the output terminals of the current control circuit. In this case, even if a value input to the short circuit response circuit 3 increases to exceed a predetermined value corresponding to the threshold voltage Vth of the LED 4, the switching element SW1 remains turned off without causing a current to flow into the LED 4. This is because the output signal Va6 from the Q terminal of the D-type flip-flop element 7 is changed only when the output signal Va4 input to the CLK terminal switches from an L level to an H level (or in other words, in the event of a decrease of a voltage detected by the voltage sensor from above the threshold voltage to below the threshold voltage).

Instead of controlling the switching element SW1 to be turned on/off only by comparing the magnitude of the voltage V2 across the LED 4 to the threshold voltage Vth, a control operation is performed to determine how to operate the switching element SW1 in response to a signal obtained in a falling edge associated with a decrease of the voltage V2 across the LED 4.

In other words, in one embodiment, the switching element SW1 is turned off to stop a current flowing into the LED 4 only when the voltage V2 across the LED 4 is decreased to the threshold voltage Vth of the LED 4 or less from a normal voltage due to a short circuit fault of the LED 4 or the equivalent. Even if the voltage V2 is lower than the threshold voltage Vth of the LED 4, the switching element SW1 is kept on to supply a current to the LED 4 when the voltage V2 rises, or otherwise is not decreasing, whereby lighting of the LED 4 is maintained. Therefore, the short circuit response circuit 3 controls the switching element SW1 so as to restrict a current flowing into the LED 4 by determining a short circuit of the LED 4 when a voltage detected by the voltage sensor is equal to or less than a predetermined value and the voltage is also decreasing.

The driver circuit in various embodiments can also be provided with a circuit which turns off the switching element SW1 for a fixed period of time in order to prevent the short circuit response circuit 3 from erroneously detecting a voltage between the output terminals of the DC/DC converter 2 as the voltage V2 across the LED 4 after turning off the switching element SW1. For example, if the LED 4 is short-circuited, the short circuit response circuit 3 maintains the switching element SW1 turned off until the above fixed period of time (i.e. several tens of milliseconds) is passed after a voltage detected by the voltage sensor decreases to a predetermined value or less. Driving of the DC/DC converter 2 itself shall be stopped by thus turning off the switching element SW1 for a fixed period of time. Alternatively, the problem of malfunctions can also be resolved by separately arranging a function to keep the switching element SW1 turned off once it is turned off.

Figure 9:
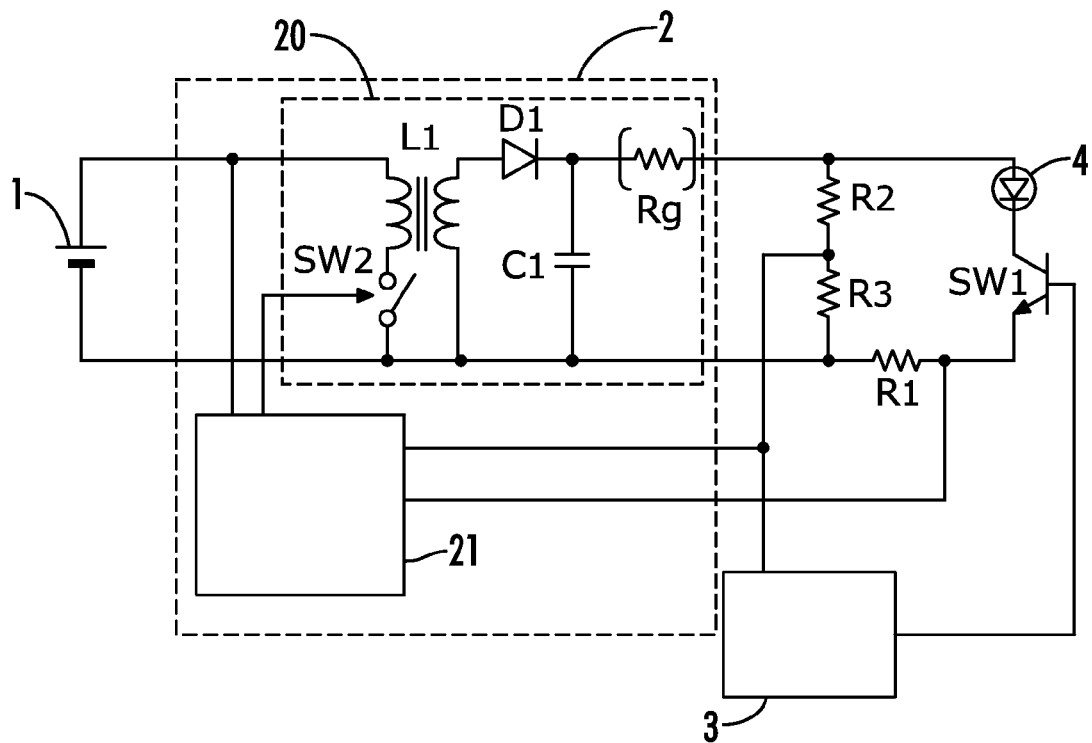
FIG. 9 is a circuit diagram showing a driver circuit according to another embodiment of the present invention.

A driver circuit according to an embodiment as shown in FIG. 9 has a current control circuit including a DC-DC converter 2 using a flyback transformer. An LED 4, a switching element SW1 serving as an LED current restriction circuit, and a resistor R1 for current detection are connected in series between output terminals of the DC/DC converter 2 serving as the current control circuit connected to a DC power source 1, thereby providing a configuration to allow a current supply to the LED 4. The LED 4, the switching element SW1 and the resistor R1, which are connected in series with each other, are connected in parallel with voltage dividing resistors R2 and R3 serving as a voltage sensor, wherein a voltage detected by the voltage sensor is input to a short circuit response circuit 3.

Here, the DC/DC converter 2 includes a step-up circuit 20 and a step-up control circuit 21, wherein a pulse signal is input from the step-up control circuit 21 to a flyback transformer L1 in the step-up circuit 20, the transformer capable of creating positive/negative voltages by mutual induction. The step-up circuit 20 in the DC/DC converter 2 has a switching element SW2 for control which is connected in series with a primary winding of the transformer L1 connected to the DC power source 1. The transformer L1 has a secondary winding connected in series with a diode D1 and a current limiting resistor Rg which constitute the step-up circuit 20 and are connected in series with the LED 4, the switching element SW1, and the resistor R1. Also arranged in the secondary winding of the transformer L1 is a capacitor C1 which is disposed between the diode D1 and the current limiting resistor Rg and connected in parallel with the LED 4, the switching element SW1, and the resistor R1.

The step-up control circuit 21 for controlling the step-up circuit 20 is incorporated in the current control circuit, and the step-up control circuit 21 receives a current of the LED 4 detected by the resistor R1 and a voltage detected by the voltage sensor made of the voltage dividing resistors R2 and R3. The step-up control circuit 21 controls the step-up circuit 20 on the basis of these signals in the LED 4.

Figure 10:
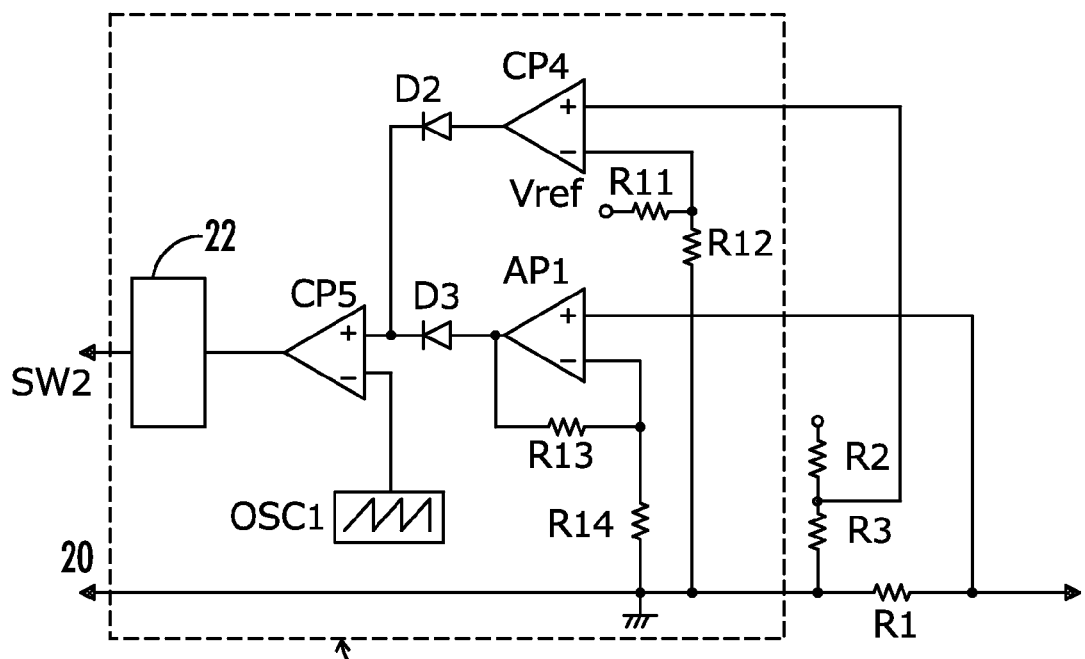
FIG. 10 is a circuit diagram showing a step-up control circuit in the driver circuit according to the embodiment of FIG. 9.

The step-up control circuit 21 may be configured as shown in FIG. 10, including two comparators CP4 and CP5, an amplifier AP1, an oscillator circuit OSC1, and a switch driver circuit 22. The comparator CP4 in the step-up control circuit 21 is provided with connections such that a voltage detected by the voltage sensor (made of the voltage dividing resistors R2 and R3) is input to a non-inverting input terminal thereof, and a voltage obtained by dividing a reference voltage Vref by voltage dividing resistors R11 and R12 is input to an inverting input terminal thereof. The amplifier AP1 has a non-inverting input terminal connected to the resistor R1 and an inverting input terminal connected to one end of a resistor 14 whose other end is grounded and one end of a resistor 13 whose end is connected to an output terminal of the amplifier AP1. An output from the comparator CP4 and an output from the amplifier AP1 are connected and input to a non-inverting input terminal of the comparator CP5 for pulse width control via a diode D2 and a diode D3, respectively. The comparator CP5 for pulse width control also has an inverting input terminal which is connected to an output of the oscillator circuit OSC1. Connected to an output terminal of the comparator CP5 for pulse width control is the switching element SW2 in the step-up circuit 20 via the driver circuit 22 so as to control the switching element SW2.

If a voltage which is detected by the voltage sensor (made of the voltage dividing resistors R2 and R3) and input to the comparator CP4 is lower than a predetermined voltage value obtained by dividing the reference voltage Vref by voltage dividing resistors R11 and R12, the comparator CP5 for pulse width control in the step-up control circuit 21 causes the amplifier AP1 to amplify a current flowing into the LED 4 and detected by the resistor R1. The comparator CP5 further compares the current to a high frequency triangular wave sent from the oscillator circuit OSC1 to realize synchronization with a high frequency output from the oscillator circuit OSC1, thereby outputting an output signal with an output pulse width corresponding to a current flowing into the LED 4. That is, the comparator CP5 for pulse width control provides a pulse width modulated (referred to as PWM hereinafter) signal whose pulse width is narrowed when a current flowing into the LED 4 is increased and whose pulse width is expanded when a current flowing into the LED 4 is reduced.

The PWM signal output from the comparator CP5 for pulse width control is input to the driver circuit 22 so as to control a period of ON-time of the switching element SW2 arranged in the primary winding of the step-up circuit 20, thereby adjusting an output from the step-up circuit 20 so as to perform a constant current control for the LED 4. Moreover, if a voltage which is detected by the voltage sensor and inputted to the comparator CP4 is higher than a value obtained by dividing the reference voltage Vref by the voltage dividing resistors R11 and R12, the comparator CP4 exhibits the H level, whereby a pulse width of the PWM signal output from the comparator CP5 for pulse width control is narrowed in accordance with a signal output from the comparator CP4. Therefore, if a voltage output from the step-up circuit 20 is equal to or higher than a predetermined value, the PWM signal is also used via the driver circuit 22 to control the step-up circuit 20 to suppress an output.

In various embodiments the short circuit response circuit 3 may have a configuration similar to that shown in FIG. 1b and the driver circuit is capable of preventing the LED 4 from being damaged when the LED 4 is short-circuited. Also note that the current limiting resistor Rg shown in FIG. 9 is a resistor preferably used for inrush current suppression. The current limiting resistor Rg, which is effective to reduce an inrush current or equivalent undesired currents flowing into the LED 4 when the power source is turned on, is capable of reducing a resistance value when the LED 4 has a large current withstanding capability, but may also be omitted. In various embodiments previously described or shown with reference to only one LED 4, one of skill in the art will understand that a plurality of LEDs 4 connected in series with each other may also be used as shown in FIG. 4.

Figure 11:
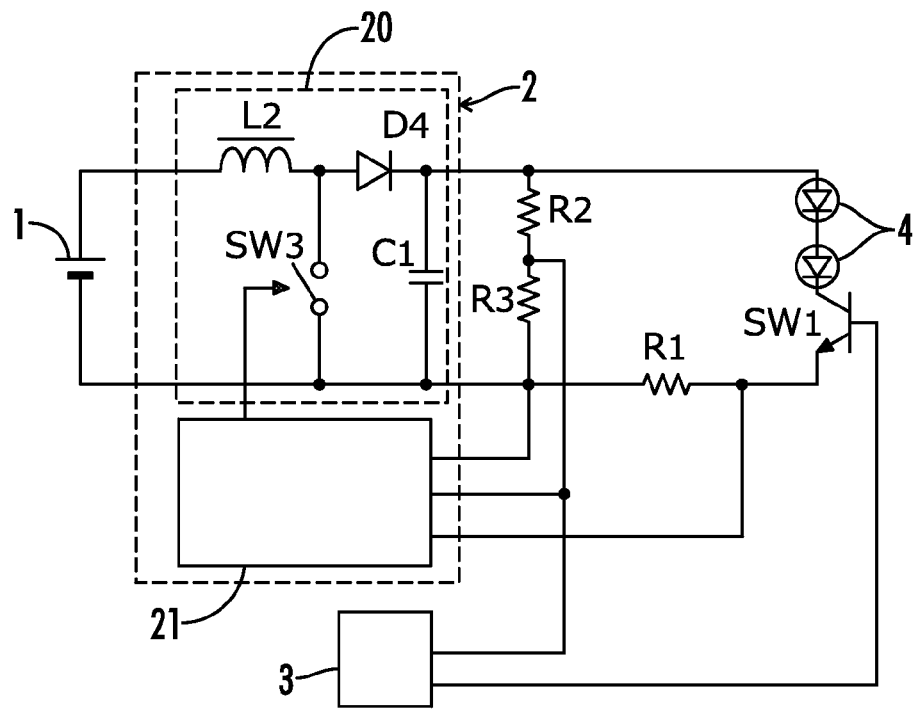
FIG. 11 is a circuit diagram showing a driver circuit according to another embodiment of the present invention.

A driver circuit in an embodiment as shown in FIG. 11 may include a step-up chopper circuit as a DC/DC converter 2 using alternative circuitry in place of the flyback transformer.

Connected in series between the output ends of the DC/DC converter 2 serving as a current control circuit connected to a DC power source 1 are two LEDs 4, a switching element SW1 serving as an LED current restriction circuit, and a resistor R1 for current detection, so as to provide a configuration to allow a current supply to the LED 4. The LEDs 4, the switching element SW1 and the resistor R1, which are connected in series with each other, are connected in parallel with voltage dividing resistors R2 and R3 serving as a voltage sensor. A voltage detected by the voltage sensor is input to the short circuit response circuit 3. The DC/DC converter 2 is a step-up chopper circuit 2 including a step-up circuit 20 and a step-up control circuit 21 for controlling the step-up circuit 20.

The step-up circuit 20 in the DC/DC converter 2 includes an inductance element L2, a diode D4, a capacitor C1 and a switching element SW3. Connected across the capacitor C1 in the step-up circuit 20 is a series circuit made of the LEDs 4, the switching element SW1 serving as the LED current restriction circuit, and the resistor R1. The inductance element L2 and the diode D4 in the step-up circuit 20 are connected in series with the LEDs 4, the switching element SW1, and the resistor R1 for current detection. The switching element SW3 in the step-up circuit 20 is connected in parallel with the capacitor C1 at a connection point between the inductance element L2 and the diode D4.

The step-up control circuit 21 controls the switching element SW3 in the step-up circuit 20 by the control signal Vb sent from the step-up control circuit 21, whereby the LED 4 is subjected to a constant current control.

The short circuit response circuit 3 of the embodiment shown in FIG. 11 may also have a configuration similar to that shown in FIG. 1b and the driver circuit is capable of preventing the LED 4 from being damaged when the LED 4 is short-circuited in the same manner as in various previously described embodiments.

The driver circuit according to an embodiment as shown in FIG. 11 may be configured in the same manner as in the embodiment of FIG. 1a except for using a current limiting resistor Rg as a current control circuit adapted to restrict a current flowing into the LED 4.

Figure 12:
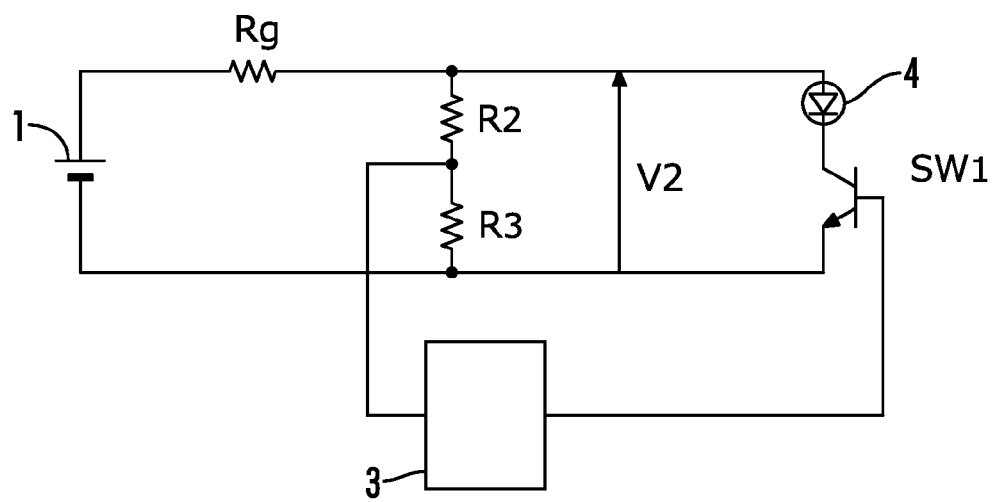
FIG. 12 is a circuit diagram showing a driver circuit according to another embodiment of the present invention.

As shown in FIG. 12, an LED 4, a switching element SW1, and a resistor R1 are connected in series with each other so as to supply a current sent from a DC power source 1 to the LED 4 via the current limiting element Rg. The LED 4, the switching element SW1, and the resistor R1, which are connected in series with each other, are connected in parallel with a voltage sensor made of voltage dividing resistors R2 and R3. A connection point between the voltage dividing resistors R2 and R3 is connected to a short circuit response circuit 3 so as to receive a divided voltage value. The short circuit response circuit 3 is connected to the switching element SW1 which is connected in series with the LED 4, wherein a control signal Vb sent from the short circuit response circuit 3 is used to control the switching element SW1 so as to reduce a current supplied to the LED 4 when the LED 4 is short-circuited.

The short circuit response circuit 3 in an embodiment as shown in FIG. 12 may have a configuration similar to that shown in FIG. 1b and the driver circuit is capable of preventing the LED 4 from being damaged when the LED 4 is short-circuited in similar manners as in other embodiments.

Figure 13:
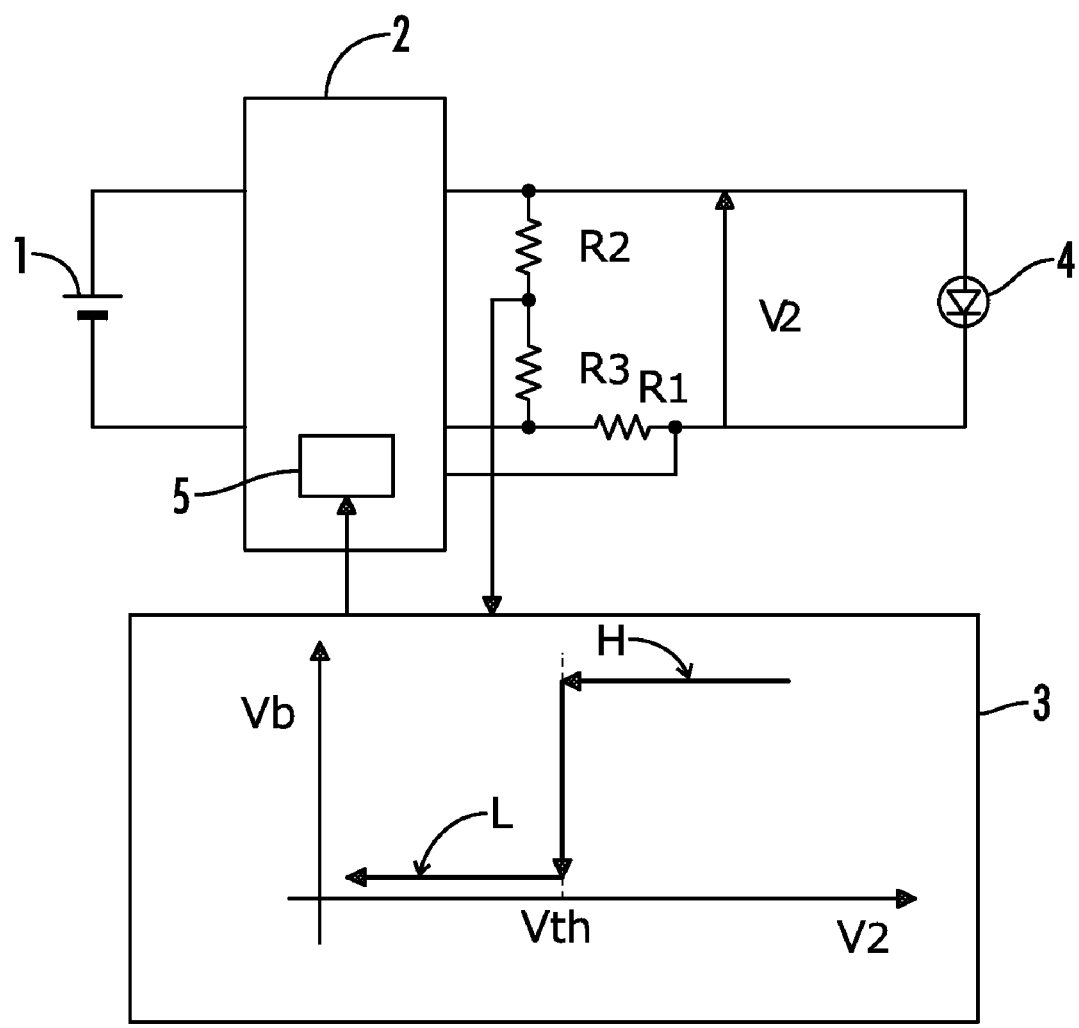
FIG. 13 is a circuit diagram showing a driver circuit according to another embodiment of the present invention.

Referring now to FIG. 13, in an embodiment as shown current may be restricted from flowing into an LED 4 by an LED current restriction circuit 5 using a switching element in a DC/DC converter 2, in place of restricting a current flowing into the LED 4 by using the switching element SW1 connected in series with the LED 4.

In the example shown, the driver circuit lights the LED 4 by supplying a current sent from the DC/DC converter 2, which is connected to the DC power source 1, to the LED 4. A series circuit made of the LED 4 and a resistor R1 preferably arranged for current detection is connected in parallel with a series circuit made of voltage dividing resistors R2 and R3 serving as a voltage sensor, and a voltage detected by the voltage sensor is input to the short circuit response circuit 3. Based on a control signal Vb sent from a short circuit response circuit 3, a current supplied from the DC/DC converter 2 serving as the current control circuit to the LED 4 is restricted.

The short circuit response circuit 3 outputs the control signal Vb in the L level if a voltage detected by the voltage sensor is equal to or less than a predetermined value defined for LED short circuit determination (i.e. threshold voltage Vth of LED 4). The DC/DC converter 2 terminates the LED current restriction circuit 5 incorporated therein in accordance with the above control signal Vb provided in the L level, thereby terminating driving of the DC/DC converter 2.

Figure 14:
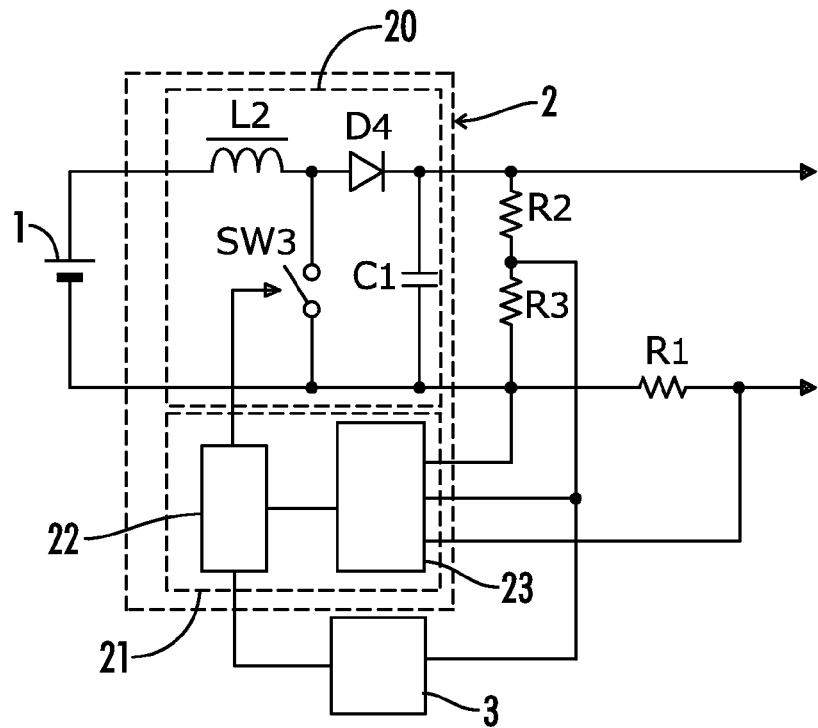
FIG. 14 is a circuit diagram showing a DC/DC converter in the driver circuit according to the embodiment of FIG. 13.

Referring now to FIG. 14, the DC/DC converter 2 serving as the current control circuit in the embodiment of FIG. 13 is made of a step-up circuit 20 and a step-up control circuit 21 for controlling the step-up circuit 20, wherein the step-up circuit 20 uses a step-up chopper circuit and the step-up control circuit 21 is made of a switch driver circuit 22 and a switch driver control circuit 23. The switch driver control circuit 23 is configured to receive a current flowing into the LED 4 from the resistor R1 connected in series with the LED 4, and also a voltage detected by the voltage sensor (made of the voltage dividing resistors R2 and R3) connected in parallel with the LED 4. In various embodiments the switch control circuit 23 can be configured as a general circuit capable of generating a PWM signal.

There is also a configuration provided such that a voltage detected by the voltage sensor (made of the voltage dividing resistors R2 and R3) is similarly input to the short circuit response circuit 3, while an output from the short circuit response circuit 3 and an output from the above switch driver control circuit 23 are input to the switch driver circuit 22. The switch driver circuit 22 controls turning on/off of a switching element SW3 in the step-up circuit 20, whereby a current flowing into the LED 4 serving as a load is controlled. Note that the switching element SW3 can be included a bipolar transistor, MOSFET or other components.

Figure 15:
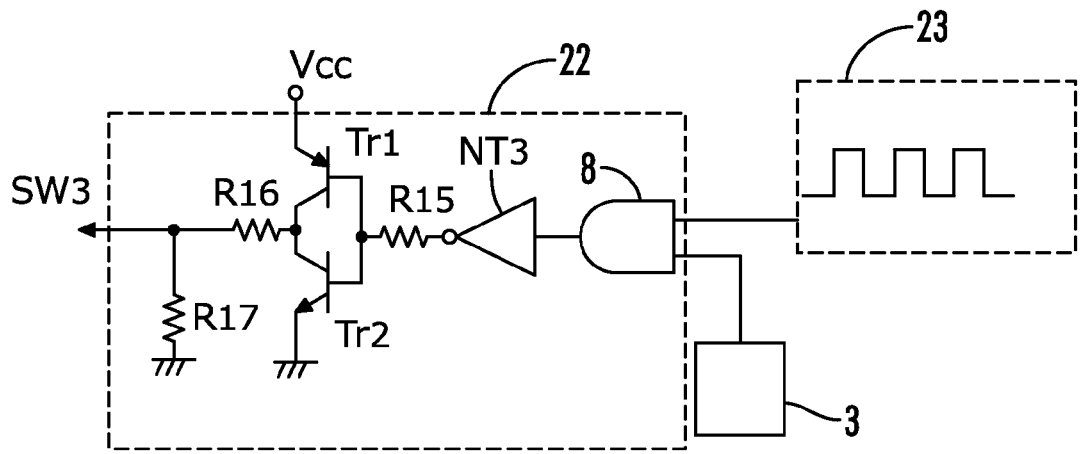
FIG. 15 is a circuit diagram showing a switch driver circuit in the driver circuit according to the embodiment of FIG. 13.

The switch driver circuit 22 which controls the switching element SW3 incorporated in the DC/DC converter 2 may be configured as shown in FIG. 15, wherein an AND element 8, an inverter element NT3, and a resistor R15 are connected in series, and the serially connected resistor R15 is connected to respective bases of transistors Tr1 and Tr2. The transistor Tr1 may be a PNP-type transistor, and the transistor Tr2 may be an NPN-type transistor. The transistor Tr1 has a collector connected to a positive power source Vcc and an emitter connected to a collector of the transistor Tr2 and one end of a voltage dividing resistor R16. One end of a voltage dividing resistor R17 and an emitter of the transistor Tr2 are grounded. A configuration is thereby provided such that a signal divided by voltage dividing resistors R16 and R17 is output to the switching element SW3 in the step-up circuit 20.

In response to the PWM signal from the switch control circuit 23 and a signal output from the short circuit response circuit 3, the AND element 8 causes the transistors Tr1 and Tr2 to control driving of the switching element SW3. Therefore, if a voltage detected by the voltage sensor is higher than the threshold voltage Vth, a signal in the H level is input from the short circuit response circuit 3 to the AND element 8. Also, in order to subject the LED 4 to a constant current drive, the PWM signal input from the switch control circuit 23 to the AND element 8 is inverting by the inverter element NT3, and this inverting signal is input to the respective bases of the transistors Tr1 and Tr2, whereby the switching element SW3 in the step-up circuit 20 using the step-up chopper circuit is subjected to a driving control. Here, if a voltage detected by the voltage sensor is equal to or less than the threshold voltage Vth and the short circuit response circuit 3 outputs a signal in the L level, the signal is inverting by the inverter element NT3 and output to the respective bases of the transistors Tr1 and TR2 via the resistor R15. Therefore, the transistor Tr2 is turned on to bring the control signal into the L level, so that the switching element SW3 in the step-up circuit 20 stops operating. Accordingly, no current is supplied to the LED 4.

Although one LED 4 is used in the embodiments shown in FIGS. 13-15, a plurality of LEDs may also be used. In this case, a higher voltage than that of the low output DC power source 1 can be generated, so that the driver circuit can be provided with sufficient power to allow a larger number of the LEDs 4 to be connected in series.

A driver circuit according to an embodiment as shown in FIG. 13 may be configured to include two LED current restriction circuits so as to restrict a current flowing into an LED 4 by using both of the LED current restriction circuits. One of the LED current restriction circuits includes a switching element SW1 connected in series with the LED 4 and a current limiting resistor Rs connected in parallel with the switching element SW1. The other LED current restriction circuit includes a DC/DC converter 2 with current control circuit which controls a current flowing into the LED 4 by using a switching element SW3 in the DC/DC converter 2 in a manner as previously described with respect to other embodiments.

Figure 16:
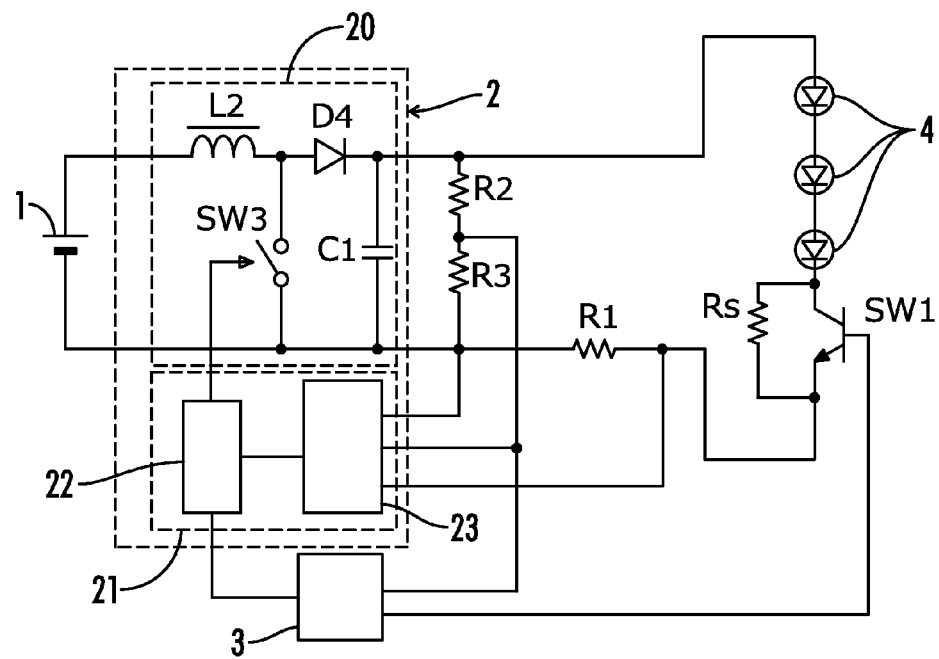
FIG. 16 is a circuit diagram showing a driver circuit according to another embodiment.

Referring now to FIG. 16, an embodiment of the driver circuit may include the DC/DC converter 2 for controlling a current supplied from a DC power source 1 to the LEDs 4, an array of three LEDs 4 connected in series between output ends of the DC/DC converter 2, one of the LED current restriction circuits as described above, and a resistor R1 for current detection by which a current flowing into the LED 4 is detected, wherein the above one of the LED current restriction circuits includes the switching element SW1 and the current limiting resistor Rs connected in parallel with the switching element SW1. A series circuit made of the LEDs 4, the above one of the LED current restriction circuits and the resistor R1 is connected in parallel with a voltage sensor made of voltage dividing resistors R2 and R3. A voltage detected by the voltage sensor is input to a short circuit response circuit 3.

The DC/DC converter 2 includes a step-up circuit 20 and a step-up control circuit 21 for controlling the step-up circuit 20, wherein the step-up control circuit 21 includes a switch driver circuit 22 and a switch control circuit 23. The short circuit response circuit 3 has two outputs including one provided to the above one of the LED current restriction circuits and the other one provided to the switch driver circuit 22 in the DC/DC converter 2.

In a configuration thereby provided, the switching element SW1 in the above one of the LED current restriction circuits is controlled to be turned on/off on the basis of an output from the short circuit response circuit 3, and the switch driver circuit 22 controls the switching element SW3 in the step-up circuit 20 serving as the other LED current restriction circuit to be turned on/off on the basis of an output from the short circuit response circuit 3. The switch driver circuit 22 may have a configuration similar to the switch driver circuit 22 as shown in the embodiment of FIG. 15.

Figure 17:
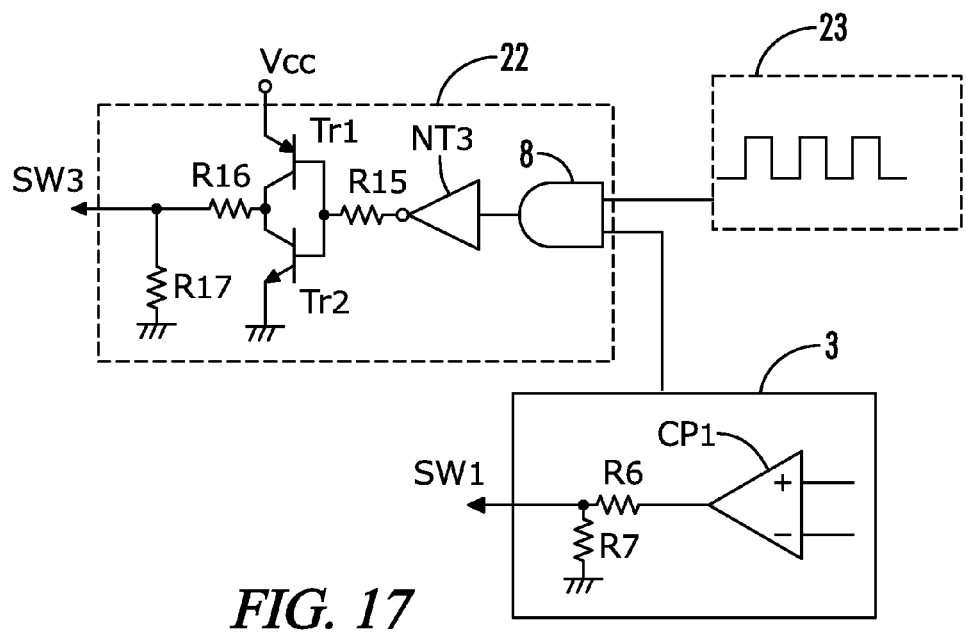
FIG. 17 is a circuit diagram detailing various components of the driver circuit according to the embodiment of FIG. 16.

Referring now to FIG. 17, the short circuit response circuit 3 in an embodiment includes a comparator CP1 and voltage dividing resistors R6 and R7 connected to an output of the comparator CP1, wherein the voltage resistor R7 has one end, which is not connected to the voltage dividing resistor R6, grounded. The comparator CP1 has a non-inverting input terminal to which a voltage detected by the voltage sensor is input, and an inverting input terminal to which a predetermined value defined for short circuit determination for the LED 4 is input (not shown). The comparator CP1 is configured to output a signal to the driver circuit 22 and to, via the voltage dividing resistors R6 and R7 for dividing the signal, the switching element SW1 serving as the LED current restriction circuit.

Described next is an operation in accordance with the embodiment of FIG. 17. The AND element 8 receives a PWM signal from the switch control circuit 23 and a signal output from the short circuit response circuit 3, followed by driving of the switching element SW3. Therefore, if a voltage detected by the voltage sensor is higher than a predetermined value defined for short circuit determination for the LED 4, a signal in the H level is input from the short circuit response circuit 3 to the AND element 8. Moreover, in order to subject the LED 4 to a constant current drive, the PWM signal input from the switch control circuit 23 to the AND element 8 is inverting by an inverter element NT3, and this inverting signal is input to respective bases of transistors Tr1 and Tr2 to perform a driving control for the switching element SW3 in the DC/DC converter 2 using a step-up chopper circuit. Here, if the LED 4 is short-circuited and a voltage detected by the voltage sensor is equal to or less than a predetermined value defined for short circuit determination for the LED 4, the short circuit response circuit 3 outputs a signal in the L level which is inverting by the inverter element NT3, followed by input of the signal to the respective bases of the transistors Tr1 and Tr2 via a resistor R15. Therefore, the transistor Tr2 is turned on to bring the output signal into the L level, whereby the switching element SW3 serving as the above other LED current restriction circuit in the step-up circuit 20 stops operating. The short circuit response circuit 3 similarly controls the remaining LED current restriction circuit to restrict a current flowing into the LED 4.

Therefore, a current flowing into the LED 4 can be restricted by both the switching element SW1 connected in series with the LEDs 4 and the switching element SW3 arranged in the current control circuit, thereby making it possible to prevent the LED 4 from being damaged while further protecting the driver circuit when the LED 4 is short-circuited.

In various embodiments the current control circuit may further consist of a step-down chopper control or a forward-type converter by which any voltages and currents are spuriously created as an effective value from an AC power source through repeatedly turning on/off a current. The control circuit may also be configured by using a micro computer or equivalent means for PWM control as known in the art.

Thus, although there have been described particular embodiments of the present invention of a new and useful LED Driver Circuit with Over-Current Prevention During a Short Circuit Condition, it is not intended that such references be construed as limitations upon the scope of this invention except as set forth in the following claims.

What is claimed is:

1. An LED driver circuit comprising:
   a current control circuit configured to receive an input signal from a power source and to provide a current output for powering one or more LEDs;
   a voltage sensor configured to detect a voltage across the LED;
   an LED current restriction circuit configured to restrict a current flow into the LED;
   a short circuit response circuit configured to control the LED current restriction circuit dependent on a comparison between the voltage detected by the voltage sensor and a predetermined threshold value;
   wherein the short circuit response circuit controls the LED current restriction circuit so as to restrict a current flowing into the LED upon determining the voltage detected by the voltage sensor is equal to or less than the predetermined threshold value; and
   wherein the LED current restriction circuit comprises a first switching element connected in series with the LED, and the current control circuit comprises a power converter further comprising a second switching element, a switch driver circuit and a switch driver control circuit, the switch driver circuit configured to control a current output supplied to the LED by driving the second switching element in response to a voltage provided by the voltage sensor to the switch driver control circuit.

2. The driver circuit according to claim 1, wherein the current control circuit comprises one or more current limiting resistors coupled between the power source and the one or more LEDs.

3. The driver circuit according to claim 1, wherein the current control circuit is a power converter configured to control a current output supplied to the LED by using a switching element, and the LED current restriction circuit further uses the switching element to restrict current flow into the LED.

4. The driver circuit according to claim 1, wherein the predetermined threshold value corresponds to a value in a range from 1/3 times to 5/6 times a normal voltage across the LED.

5. The driver circuit according to claim 1, wherein the short circuit response circuit controls the LED current restriction circuit so as to restrict a current flowing into the LED upon determining the voltage detected by the voltage sensor is equal to or less than the predetermined value and the voltage and is decreasing.

6. The driver circuit according to claim 1, herein the LED current restriction circuit comprises a switching element connected in series between the power source and the LED.

7. The driver circuit according to claim 6, wherein the LED current restriction circuit further comprises a current limiting resistor connected in parallel with the switching element.

8. The driver circuit according to claim 1, wherein the switch driver circuit is further configured to restrict a current output by turning off the second switching element.

9. The driver circuit according to claim 8, wherein the short circuit response circuit is configured to control both of the first switching element in the LED current restriction circuit and the second switching element in the current control circuit to restrict a current flow, the control dependent on a comparison between the voltage detected by the voltage sensor and the predetermined threshold value.

10. An LED driver circuit comprising:
an LED current restriction circuit configured to restrict a current flow into the LED, the current restriction circuit further comprising a first switching element coupled in series with the LED;
a power converter further comprising a second switching element, the power converter configured to receive an input signal from a power source and to control a current output for powering an LED using the second switching element;
a voltage sensor configured to detect a voltage across the LED;
a short circuit response circuit configured to control the LED current restriction circuit to restrict current flow to the LED dependent on the voltage detected by the voltage sensor being equal to or below a predetermined threshold value;
wherein the short circuit response circuit is configured to control the LED current restriction circuit to restrict current flow to the LED dependent on the voltage detected by the voltage sensor being equal to or below a first predetermined threshold value, or above a second predetermined threshold value; and
the short circuit response circuit further comprises
a first comparator having inputs associated with the voltage detected by the voltage sensor and the first predetermined threshold value, the comparator further having an output coupled to a first input of an AND circuit, and
a second comparator having inputs associated with the voltage detected by the voltage sensor and the second predetermined threshold value, the comparator further having an output coupled to a second input of the AND circuit,
wherein an output of the AND circuit is further coupled to the LED restriction circuit.

11. The driver circuit of claim 10, wherein the LED current restriction circuit further comprises a current limiting resistor connected in parallel with the first switching element.

12. The driver circuit of claim 10, wherein the voltage sensor further comprises a pair of series connected resistors coupled in parallel with the power converter output connections, and wherein the short circuit response circuit is coupled to a node between the pair of series connected resistors.

13. The driver circuit of claim 10, the short circuit response circuit comprising a comparator having inputs associated with the voltage detected by the voltage sensor and the predetermined threshold value, the comparator further having an output coupled to the LED restriction circuit.

14. The driver circuit of claim 13, the short circuit response circuit configured to control the LED current restriction circuit to restrict current flow to the LED dependent on the voltage detected by the voltage sensor being both of equal to or below the predetermined threshold value, and decreasing in value.

15. An LED driver circuit for powering one or more LEDs connected in series, the driver circuit comprising:
a first switching element coupled in series with the one or more LEDs and configured to switch between a first state where current flows through the LEDs and a second state where current is restricted from flowing through the LEDs;
a voltage sensor coupled in parallel with the first switching element and the one or more LEDs;
a current sensor coupled in series with the first switching element and the one or more LEDs;
a power converter further comprising a second switching element, the power converter configured to receive an input signal from a power source;
a switch controller coupled to receive a voltage detected by the voltage sensor and to receive a current detected by the current sensor, the switch controller configured to control the switch state of the second switching element and control an output signal from the power converter based on the detected signals;
a short circuit response circuit configured to control the first switching element to restrict current flow to the one or more LEDs dependent on the voltage detected by the voltage sensor being equal to or below a predetermined threshold value;
wherein the short circuit response circuit is configured to control the first switching element to restrict current flow to the one or more LEDs dependent on the voltage detected by the voltage sensor being both of equal to or below the predetermined threshold value, and decreasing in value; and
wherein the short circuit response circuit is further configured to continue controlling the first switching element to restrict current flow to the one or more LEDs even if a current is made to flow again from the power source to the LED after observing a short circuit of the LED.

16. The driver circuit of claim 15, wherein the short circuit response circuit is configured to control the first switching element to restrict current flow to the one or more LEDs for at least a predetermined period of time.

* * * * *